（12） United States Patent
Zalewski (10) Patent No.: US 9,643,251 B2
(45) Date of Patent: May 9, 2017

(54) OPTIMIZED ADDITIVE MANUFACTURING PROCESS (71) Applicant: ZIN TECHNOLOGIES, INC., Middleburg Heights, OH (US)

(72) Inventor: Bart F. Zalewski, Broadview Heights, OH (US)

(73) Assignee: ZIN TECHNOLOGIES, INC., Middleburg Heights, OH (US)

( * ) Notice: Subject to any disclaimer, the term of this patent is extended or adjusted under 35 U.S.C. 154(b) by 42 days.

(21) Appl. No.: 14/739,739

(22) Filed: Jun. 15, 2015

(65) Prior Publication Data
US 2015/0360288 A1 Dec. 17, 2015

Related U.S. Application Data (60) Provisional application No. 62/011,650, filed on Jun. 13, 2014.

(51) Int. Cl.
| *G05B 15/02* | (2006.01) |
| *B33Y 50/02* | (2015.01) |
| *G05B 19/4099* | (2006.01) |
| *B22F 3/105* | (2006.01) |
| *B22F 3/16* | (2006.01) |
| *B33Y 10/00* | (2015.01) |
| *B33Y 30/00* | (2015.01) |
| *B29C 67/00* | (2017.01) |
| *B22F 1/00* | (2006.01) |

(52) U.S. Cl.
CPC .............. *B22F 3/1055* (2013.01); *B22F 3/16* (2013.01); *B29C 67/0077* (2013.01); *B33Y 10/00* (2014.12); *B33Y 30/00* (2014.12); *B22F 1/0048* (2013.01); *B22F 2003/1057* (2013.01); *Y02P 10/295* (2015.11)

(58) Field of Classification Search
USPC .............................. 700/28, 71, 95, 117–119
See application file for complete search history.

(56) References Cited

U.S. PATENT DOCUMENTS

| 7,550,518 | B2* | 6/2009 | Bredt | .................... B29C 41/003 106/162.9 |
| 7,847,057 | B2* | 12/2010 | Muller | ................ B29C 67/0077 264/113 |
| 2001/0050031 | A1* | 12/2001 | Bredt | .................... B29C 41/003 106/162.9 |
| 2011/0052927 | A1* | 3/2011 | Martinoni | ........... B29C 67/0077 428/474.7 |
| 2014/0048969 | A1* | 2/2014 | Swanson | ............. B29C 67/0055 264/129 |
| 2015/0266236 | A1* | 9/2015 | Farah | .................. B29C 67/0051 264/406 |

* cited by examiner

*Primary Examiner* — Ronald Hartman, Jr.
(74) *Attorney, Agent, or Firm* — Tarolli, Sundheim, Covell & Tummino LLP (57) ABSTRACT

A method for additive manufacturing a multilayered part includes optimizing a powder material based on at least one parameter characterizing the powder material. Each layer of the multilayered part formed from the optimized powder material is optimized based on at least one parameter characterizing the layer. The multilayered part is formed using additive manufacturing based on the optimized powder material and optimized layers constituting the multilayered part. The multilayered part is optimized based on at least one parameter characterizing the multilayered part.

23 Claims, 7 Drawing Sheets

OPTIMIZED ADDITIVE MANUFACTURING PROCESS

RELATED APPLICATIONS

This application claims the benefit of U.S. Provisional Application Ser. No. 62/011,650, filed Jun. 13, 2014, the entirety of which is incorporated herein by reference.

TECHNICAL FIELD

This disclosure relates generally to additive manufacturing and, in particular, relates to optimizing a plurality of steps in an additive manufacturing process in a co-dependent manner.

BACKGROUND

The process of additive manufacturing is generally known in the art and already being performed. The current designs and manufacturing processes, however, are not optimized and do not take into account all aspects of additive manufacturing technology. Rather, the current techniques were developed based on different manufacturing techniques and maximized based on individual, independent parameters that are not optimized through mathematical and scientific parametric analysis and techniques, and are not additive manufacturing specific. The current approaches underutilize the potential of additive manufacturing and cause both unnecessary cost increase and structural inefficiency.

SUMMARY

This disclosure relates generally to additive manufacturing and, in particular, relates to optimizing a plurality of steps in an additive manufacturing process in a co-dependent manner.

As one example, a method for additive manufacturing a multilayered part includes optimizing a powder material based on at least one parameter characterizing the powder material. Each layer of the multilayered part formed from the optimized powder material is optimized based on at least one parameter characterizing the layer. The multilayered part is formed using additive manufacturing based on the optimized powder material and optimized layers constituting the multilayered part. The multilayered part is optimized based on at least one parameter characterizing the multilayered part.

As another example, a non-transitory computer readable medium has instructions programmed to perform a method that includes optimizing a powder material based on at least one parameter characterizing the powder material. Each layer of the multilayered part formed from the optimized powder material is optimized based on at least one parameter characterizing the layer. The multilayered part is formed using additive manufacturing based on the optimized powder material and optimized layers constituting the multilayered part. The multilayered part is optimized based on at least one parameter characterizing the multilayered part.

As yet another example, a system includes a material optimizing component for optimizing a powder material based on at least one parameter characterizing the powder material. A structural optimization component optimizes each layer of the multilayered part formed from the optimized powder material based on at least one parameter characterizing the layer. A manufacturing optimization component forms the multilayered part using additive manufacturing based on the optimized powder material and optimized layers constituting the multilayered part. The multilayered part is optimized based on at least one parameter characterizing the multilayered part.

DETAILED DESCRIPTION

This disclosure relates generally to additive manufacturing and, in particular, relates to optimizing a plurality of steps in an additive manufacturing process in a co-dependent manner. In the process, a powder material is used to produce a multilayered part, which is optimized. The material optimization results are used to structurally optimize how the multilayered part is constructed. The structural optimization results are then used to optimize the actual manufacturing or fabrication of the multilayered part. The transition from material optimization to structural optimization to manufacturing optimization constitutes one cycle and may correspond with forming one layer of the multilayered part. Each cycle of the process is performed and compared to predetermined manufacturing constraints, e.g., performance, cost, and schedule restrictions. If the particular cycle (or layer) meets the constraints, the design is finalized and the multilayered part completed with the same set of optimized parameters. If the particular cycle (or layer) does not meet the constraints, the manufacturing optimization results are used to optimize a new material selected to adjust the out-of-line constraints. The cycle iterations are repeated until the design can be finalized and the multilayered part completed.

The process disclosed herein is co-dependent in that the design parameters chosen and considered for each step in the process affect the parameters of at least one other step in the process. Consequently, optimizing each step in the process affects the optimization of at least one other, e.g., subsequent, step in the process.

In one example, a powder material is optimized, the topology of the multilayered part to be made from the optimized material is optimized, the thickness of each layer in the multilayered part is optimized, and the manufacturing parameters for constructing the multilayered part, e.g., laser characteristics, production cost, and production time, are optimized to complete one cycle. Iterations of this cycle are then repeated until the material, geometry, material thickness, and laser parameters are optimized to meet cost, schedule, and performance criteria. In summation, the invention provides an optimization process of the entire analysis, design, and manufacturing of the multilayered part from powder material synthesis and processing to structural analysis to fabrication of the final multilayered part. The implementation of the process disclosed herein can provide cost-effective, time efficient, and more reliable additive manufacturing for entire products or components using computer modeling, analysis, optimization, and scalable engineering.

Figure 1:
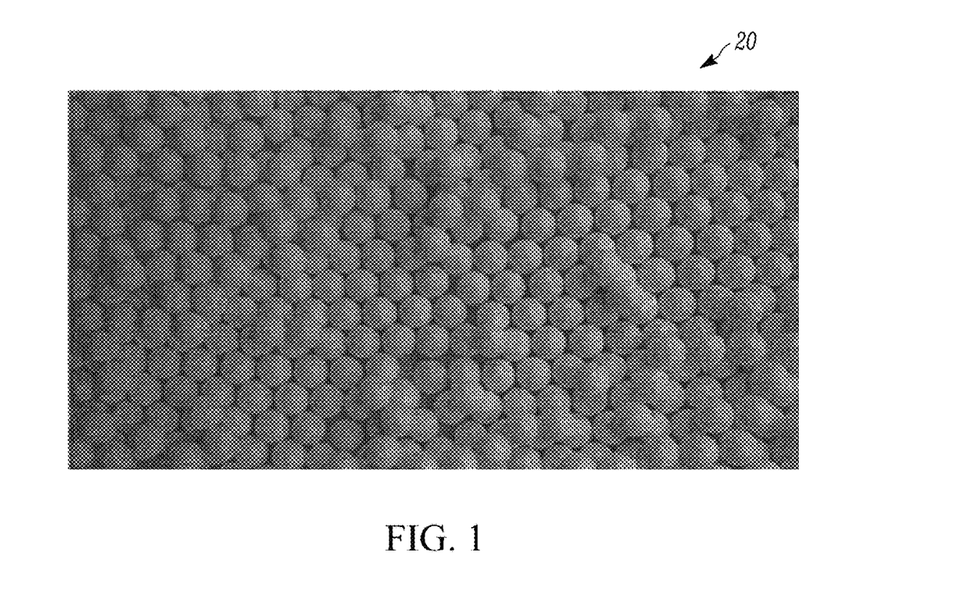
FIG. 1 illustrates a powder material for use with an optimized additive manufacturing process in accordance with the present invention.

FIGS. 1-10 illustrate aspects of an optimized additive manufacturing process for producing a multilayered structure or part in accordance with the invention. FIG. 1 illustrates one example of a powder material 20 for use in the process. The powder material 20 may include, for example, one or more metals or metal alloys, such as Aluminum alloys, Titanium alloys or Cobalt alloys.

By way of example, the first stage of optimization in the process is material optimization. The material optimization part of the system includes linking the micromechanics, or powder design, to the macromechanics, or bulk material design. Due to this linkage, the desirable mechanical properties of the multilayered part can be configured or designed to optimize the functionality of the multilayered part. In this stage, a particular powder material is selected and prepared to optimize one or more desired parameters for the multilayered part. These desired parameters may include mass, density, mechanical properties, thermodynamic performance, fluid flow, surface area vs. volume, surface finish, environmental sustainability, manufacturing time, manufacturing tolerance, color, and cost.

To this end, material optimization may include determining and selecting the powder material and one or more of parameters thereof the powder material, such as particle shape, size distribution(s), compaction, viscosity, particle polarization, composition, alloying strategy, and surface characteristics. One or more of the material parameters, e.g., mechanical properties, can be optimized in order to achieve the desired parameters in the multilayered part. The particle size distribution may be provided by the manufacturer and can be determined by, for example, sieving, gravitational sedimentation, microscopy-based visual techniques, and laser diffraction.

Figure 2:
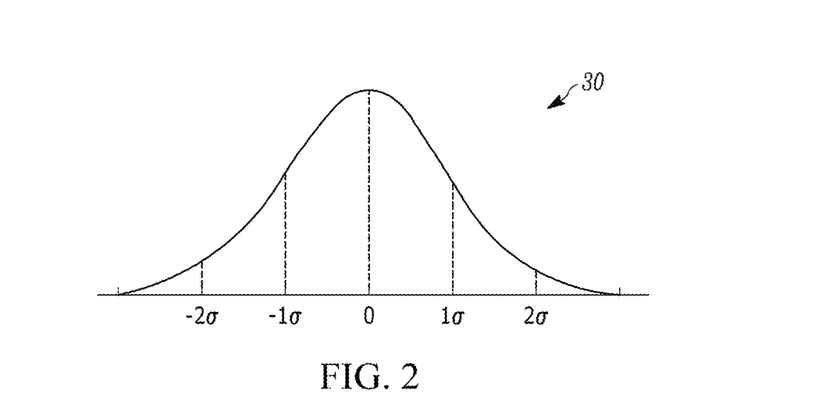
FIG. 2 graphically illustrates an example probability distribution curve for the particle size of the powder material of FIG. 1.
Figure 3:
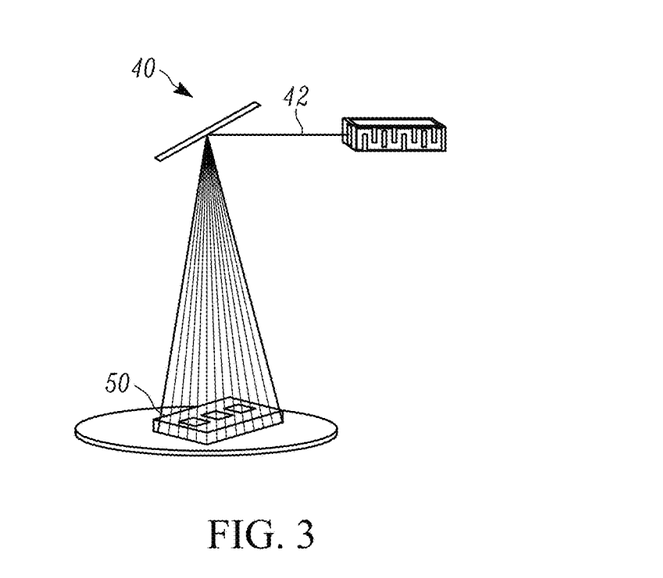
FIG. 3 illustrates one example additive manufacturing technique for use with the present invention.
Figure 4:
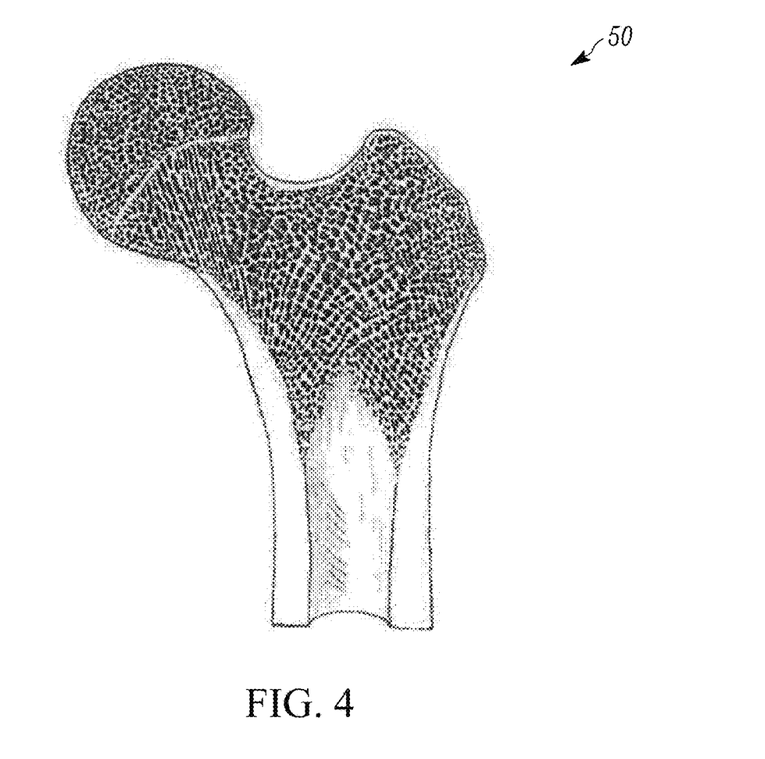
FIGS. 4-6 illustrate example multilayered parts formed using the process disclosed herein.

Referring to FIG. 2, a given probability distribution 30 for the particle size may be a function of the particle size per powder particle. One particular particle size can be used to form the multilayered part or a series of different particle sizes can be used in combination. In any case, the distribution 30 and other powder characteristics can be optimized based on performance and programmatic parameters desirable in the multilayered part. As an example, the size distribution 30 and particle characteristics can be optimized to maximize the final powder packing density and/or viscosity in the multilayered part. The particle powder density could be treated as a random variable with a probability density function provided by the powder vendor. For multiple powders and given their individual probability density function, a powder mix density can be computed based on various fractional powder compositions. The obtained pre-processed powder mix density could then be used to compute post-process material density after additive manufacturing process.

In the case of laser sintering, the powder mix density will shrink based on sintering shrinkage. The resulting final material density is directly related to mechanical material properties. The disclosed process would use Monte-Carlo simulation with Newton based optimization methods for optimizing the fractional powder compositions based on individual powder density probability density functions to obtain a probability density function of the powder mix density.

Figure 11:
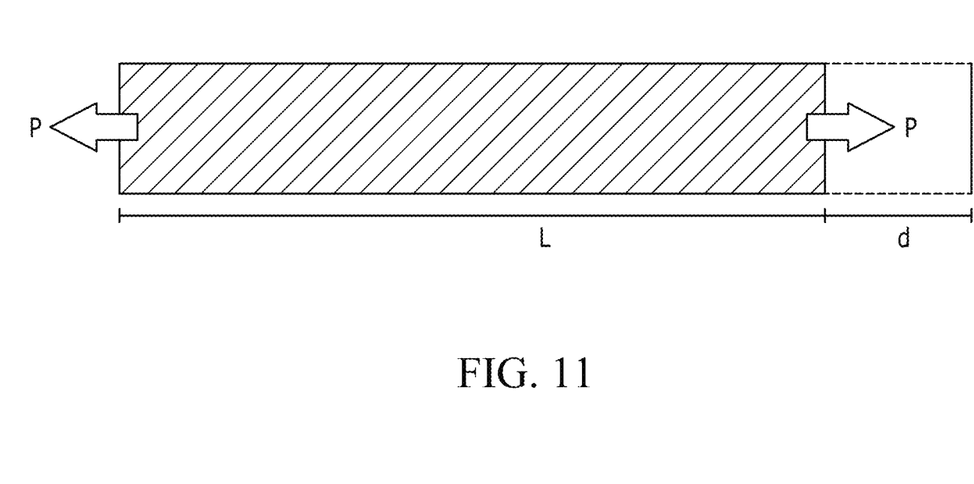
FIG. 11 depicts a bar placed in tension and elongated.

The material density probability density function resulting from additive manufacturing process will be used to assess the mechanical properties of the final part. An example of this optimization process is demonstrated on a simple bar of length "L" in tension, shown in FIG. 11, that cannot displace a given amount "d", which is this example's requirement. The bar is laser sintered from a powder composed of two powder materials. The density of the powder mix is related to the fraction of the two individual powders and the material density is obtained from the powder mix density as well as the sintering shrinkage, which is a process dependent parameter and can be determined experimentally. These relationships can be expressed mathematically by Equations 1 and 2 below.

$$\rho_T = f_1 \rho_1 + f_2 \rho_2 \quad (1)$$

$$\rho_M = \frac{\rho_T}{(1-Y)^3} \quad (2)$$

where $\rho_T$ is the powder mix density, $\rho_i$ is the material "i" density (for 1=1:2), $f_i$ is the fractional powder composition for material "i" ($f_1 = 1-f_2$), $\rho_M$ is the material density, and Y is the sintering shrinkage. The density is a function of distribution and is considered a random variable in this example with a known probability density function provided by the powder vendor. After sintering, the material density is also a random variable with a calculated probability density function. Constitutive parameters, such as Young's Modulus and Shear Modulus, are density dependent as shown is Equation 3.

$$C = f(\rho_M) \quad (3)$$

These constitutive parameters, given in a matrix form C in Equation 3 are also resulting random variables. The algorithm uses Monte-Carlo simulation, which computes a resultant for each realization of a random variable, combined with Newton based optimization methods to obtain the optimal fractional powder compositions $f_1$ and $f_2$. This must satisfy a requirement on the total displacement "d", which restricts strain under a known stress that the bar is subjected to. Since both stress state and strain state requirement are known, the constitutive parameters become requirements. The optimal powder must therefore produce an adequate stiffness in the sample bar problem. From Monte-Carlo obtained probability density function of the stiffness, the mean minus a number of standard deviations must be greater than the required stiffness. Mathematically, the optimization problem for each Monte-Carlo realization "j" is stated in Equation 4. This is done for all the realizations.

$$\forall \rho_M^j \in \rho_M \text{ find } C^j \in C | \text{mean}(C_e^j) - \beta \sigma_{C_e^j} \geq \underline{C}_e^j \quad (4)$$

Since the optimization problem is defined on the material density, it requires the optimization of fractional powder compositions. In Equation 4, "e" denotes an element of a constitutive matrix, β denotes the number of standard deviations of that element $\sigma_{C_e^j}$, and $\underline{C}$ denotes the required constitutive term, in this case Young's modulus of the bar. In general, all terms of the constitutive matrix must be found to satisfy stiffness requirements. Similar approach can be taken to achieve a desired strength requirement with an addition of changing bar thickness to minimize weight.

The next stage of optimization is structural or process design optimization in which the additive fabrication process provides optimization factors related to the processing of the optimized powder material. The structural optimization applies not only to each individual layer forming the multilayered part, but also how the layers cooperate and cumulatively effect the construction of the multilayered part. Such factors may be related to powder preparation and handling, heating characteristics, the sintering process, and any post-sintering processing. The specifics of the powder preparation process are determined based on performance parameters to be optimized in the model relating to the multilayered part. For example, the preparation process may be optimized based on one or more material properties in the multilayered part, e.g., strength, stiffness, surface finish, topology, material orientation, thickness of individual layers and the overall multilayered part thickness, and fracture toughness. Additional, non-performance based parameters, such as cost and schedule, may alternatively or additionally be incorporated into the model to help optimize the multilayered part.

To this end, by way of example, each particle size group in the powdered material can be heated to rid the particles of moisture. The dry particles can then be tumbled to smooth out the surfaces such that the particles become more round and compact more efficiently. Additionally or alternatively, the particles can be subjected to compaction processes, either in series or combination with heating and/or tumbling, to improve the compactness of the powder material following its preparation. Examples of compaction processes may include, individually or in combination, applying pressure to particles (e.g., compressing the particles in a fixed volume), vibration of a volume of particles at various frequencies, and polarization of the particles. In response to processing the powder, such as according to one of the particle processing methods mentioned above, the processed powder material is now optimized and ready for processing into fabricating the multilayered part via an additive manufacturing process.

The energy used as a heat source to melt the already optimized powder material can be supplied via laser, e-beam, plasma arc lamp, or other directed thermal method. The beamed power, which is a design parameter and therefore variable, may be modulated in intensity, speed, or other ways to optimize the process design. The heat source used to melt the optimized powder material can itself be optimized for the shortest path within each layer of the multilayered part to minimize manufacturing time and operational cost. Each powder material layer layout is determined using topology optimization that includes support structure requirements and machine constraints. The multilayered part can be also optimized based on a printing direction that provides the highest strength-per-weight ratio for the multilayered part.

It will be appreciated that although the structural optimization step is described as being the second of three steps in each cycle it will be appreciated that there may be two structural optimization components or steps between the material optimization step and the manufacturing optimization step. For example, the structural optimization step may include a topology optimization component and a thickness optimization component. In such a configuration, the shape or cross-section of each layer in the multilayered part may be optimized in the topology optimization step based upon load and size constraints. In the subsequent thickness optimization step, the thickness of the truss members forming the cross-section may be optimized to minimize weight.

Additionally, the optimization employed in the manufacturing process disclosed herein includes optimizing the actual fabrication process of the multilayered part using additive manufacturing. The manufacturing portion of the system optimization takes the inputs from the topology and function optimization and determines efficient process parameters, which may be variable based on considerations such as cost, schedule, and machine capabilities. Manufacturing process parameters to be optimized include, for example, materials that can be used, manufacturing time, energy required for manufacturing each layer, and part layout within the machine. These optimized parameters are traded within the system optimization with the above-described topology and functionality optimization to ensure that the common parameters are optimized for all constraints.

The approach disclosed herein can be used in any granular or powder-based additive manufacturing process such as, but not limited to, direct metal laser sintering (DMLS) (shown as 40 in FIG. 3), selective laser sintering (SLS), electron-beam melting (EBM), selective laser melting (SLM), and selective heat sintering (SHS). In each case, the additive manufacturing process utilizes the optimized powder material processed by any combination of the techniques described above.

In one example, a laser beam 42 (shown in FIG. 3) provides thermal energy for the fabrication process. As each layer is sequentially formed in the multilayered part 50, the thickness of the powder material layer is optimized to minimize weight, material usage, and manufacturing time. Various alloys, or other materials, and size distributions can be used within a single layer or within the composite multilayered part 50 based on the desired topology and optimized structure or 3D microstructure. The materials and processes used in these optimizations will be determined from the performance and programmatic requirements.

The optimization process disclosed herein offers a wide range of use and implementation options. In particular, the process can be licensed to analytical, design, and/or manufacturing firms that provide services related to additive manufacturing. The process can also be licensed to the producers of powder materials used in additive manufacturing. The approach can be used in a variety of fields and provide function specific optimization. The examples include manufacturing prosthetics, such as a bone prosthesis 50 (see FIG. 4), which has an outer shell that mimics the replaced bone and is optimized based on surface area to weight to meet the desirable strength, stability, and durability requirements. The internal bone trabecular pattern can be optimized for performance and cost to best mimic the real bone. The bone's trabecular structure can also be optimized for bone growth to allow the existing bone to grow into the prosthetic.

Figure 5:
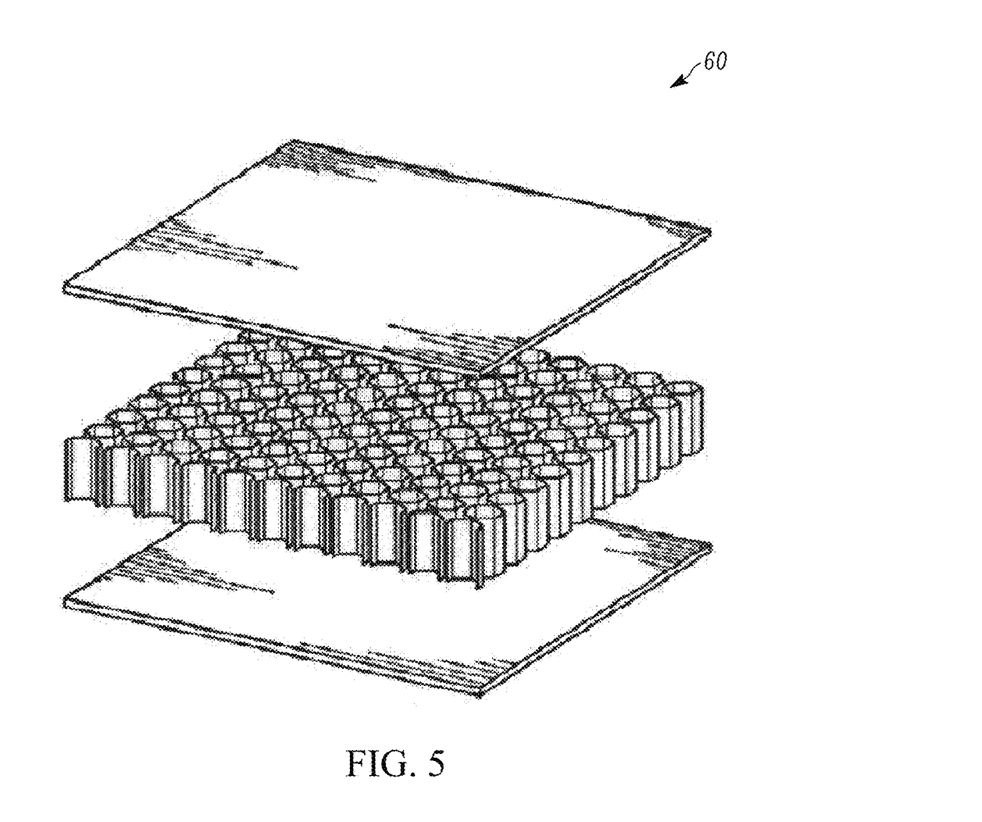
Figure 6:
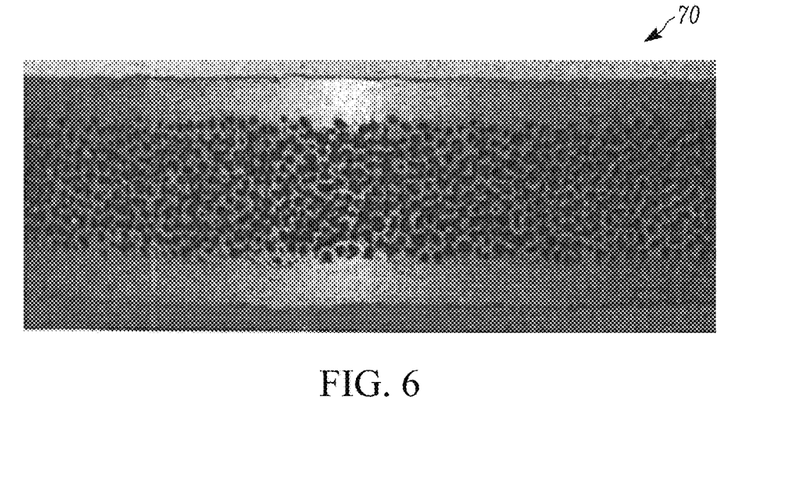

In another example, sandwich panels, such as the honeycomb panel 60 and foam core panel 70 shown in FIGS. 5 and 6, respectively, can be optimized for strength, stability, and damage tolerance using the optimized additive manufacturing process disclosed herein. Such panels 60, 70 would form an integral sandwich that does not rely on a bond between facesheets and core. Furthermore, cryogenic tanks (not shown) can benefit from the optimization process disclosed herein as they can be optimized based on thermal and strength requirements to limit boil-offs. The optimization process disclosed herein can also be used to construct acoustic resonator panels (not shown) whose shape depends on the required attenuation level and frequency (see, e.g., U.S. Patent Application No. 2015/0122,577, the subject matter of which is incorporated herein by reference in its entirety). The process described herein would greatly improve the efficiency of these resonators and optimize their manufacturing to limit permeability that affects attenuation levels.

The methods and systems disclosed herein are advantageous over the prior art for several reasons. The invention provides a process that optimizes additive manufacturing efficiency from a granular material optimization process to manufacturing process-dependent structural optimization. Unlike current optimization techniques, which only focus on a specific, isolated step in the manufacturing process, the optimization process disclosed herein utilizes all the advantages of additive manufacturing to improve product performance by optimizing each step of the process in an interrelated, co-dependent manner.

On the other hand, current compaction techniques involving only mechanical processes are neither as effective nor optimized based on final design parameters—the process is optimized without taking into account how other step(s) of the manufacturing process are affected. The methods and systems disclosed herein advantageously interrelate the complex steps of the entire additive manufacturing process from infancy to the final, multilayered part. All technical aspects of additive manufacturing are addressed using granular materials and all processing aspects integrated to obtain a truly optimized and efficient multilayered part that is specific to both the manufacturing process and the part's final function. The methods and systems disclosed herein establish the first rigorous additive manufacturing process optimization that is driven by both experimental and analytical aspects. It provides means to significantly decrease cost of additive manufacturing and increase the efficiency of the final multilayered part. Further examples of the interrelatedness of the different aspects of the manufacturing process are disclosed herein with respect to FIGS. 7-9.

The process disclosed herein can also provide a novel, advantageous process of condensing granular material using polarization while greatly improving the compaction through increased particle bonding, thereby giving the final bulk material better mechanical properties. Polarization of granular material of the type disclosed herein has not been used previously to achieve better compaction of granular materials to improve additive manufacturing process quality. Moreover, the optimizing of powder processing and handling, the distribution of powder prior to melting, and then melting of the optimized compacted powder has not to date been based on final product parameters and the specific steps of manufacturing as described herein.

While the above describes the specifics of each optimization step of the invention, the invention is most advantageous in that it integrates these optimizations throughout the process into a single model. In particular, the model links the individual parameters of each optimized step starting from the material processing, through design and analysis, to manufacturing such that the entire process can be optimized as a whole. This codependency and interrelation between optimization steps can be visualized in the example flow charts 100, 100a, 100b illustrated in FIGS. 7-9. As shown, all three types of optimization, namely, material optimization, topology and functionality, and manufacturing are performed in series but are iterated and integrated with each other to obtain a system-wide, co-dependent, and optimized solution.

In any case, in this system optimization, the shape of the multilayered part is optimized using topology optimization and optimization based on its function, such as thermal optimization or structural optimization. To this end, a series of bulk material properties are created from the material optimization with varying mechanical properties and are implemented into both topology and functionality optimization. For example, a loaded multilayered part will have a preferred load path, determined by topology optimization, and an optimal thickness, determined by structural optimization. These optimizations would utilize both the geometric inputs from manufacturing and mechanical properties from material optimization, along with performance and programmatic requirements. Such optimization also takes into account the direction(s) in which the multilayered part is 3D printed. For example, this could be selected and, thus, optimized, based on the strongest direction of the anisotropic material within the multilayered part. Non-performance considerations such as cost could also be entered as a parameter to optimize.

In view of the foregoing structural and functional description, those skilled in the art will appreciate that portions of the invention, including one or more of the optimizations stages disclosed herein, may be embodied as a method, data processing system, or computer program product. Accordingly, these portions of the invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments of the invention have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 7:
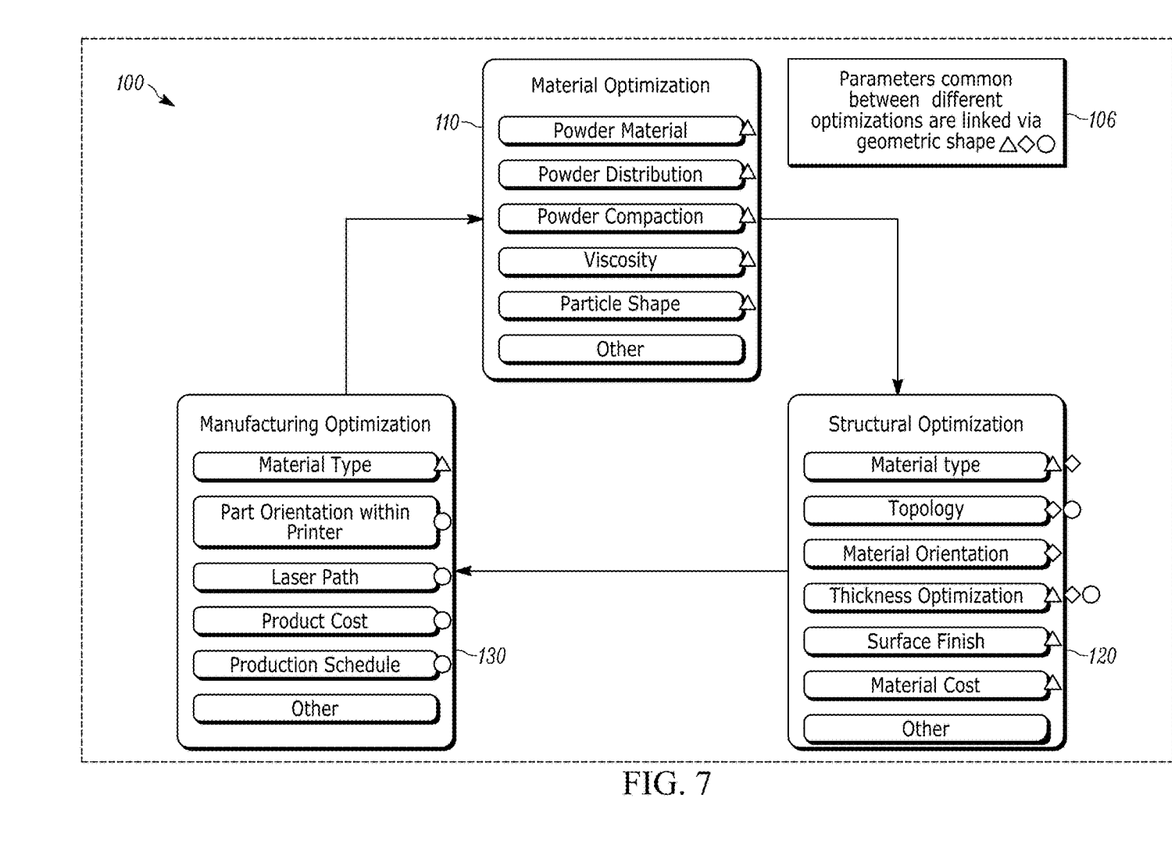
FIGS. 7-9 depict flow charts illustrating examples of optimized and co-dependent additive manufacturing steps.
Figure 8:
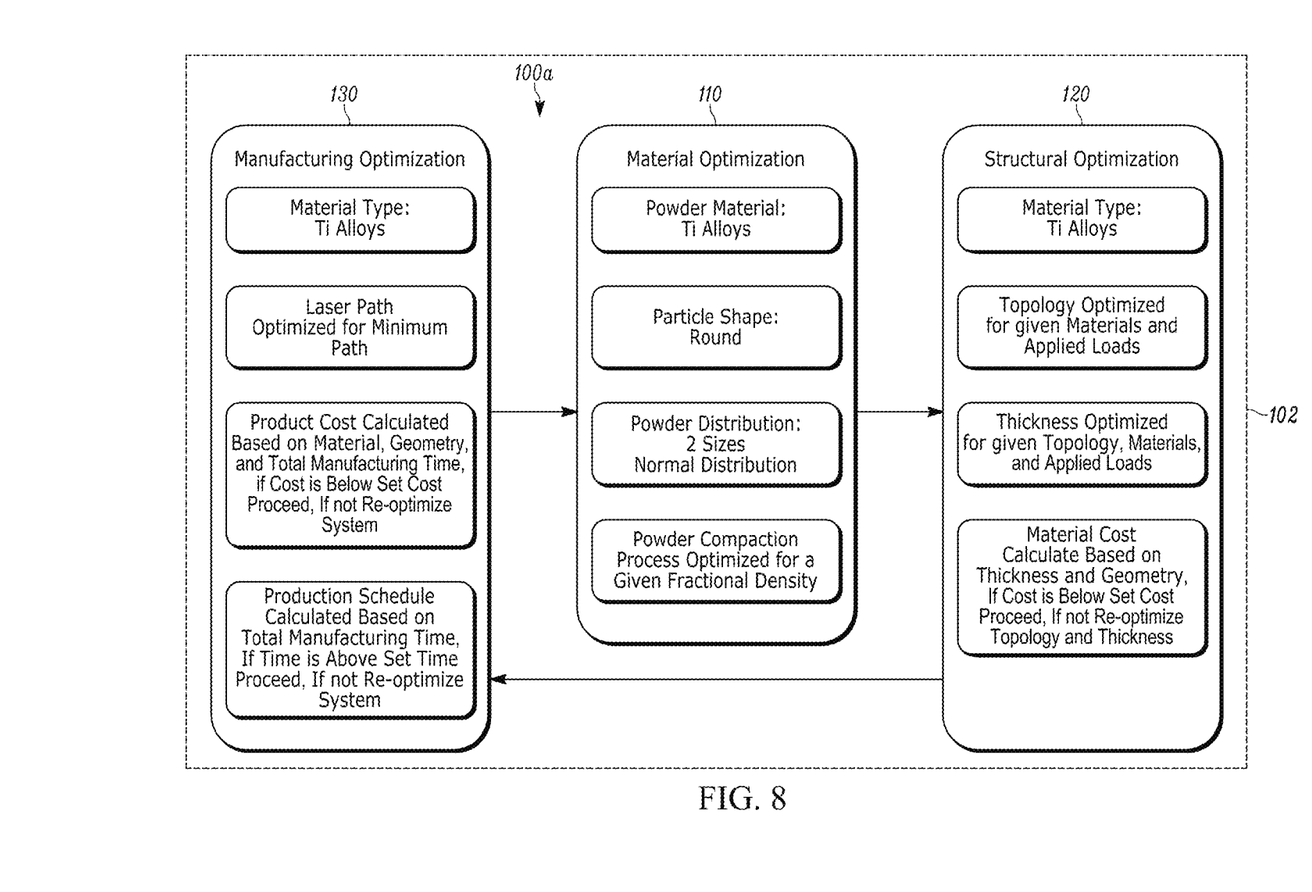
Figure 9:
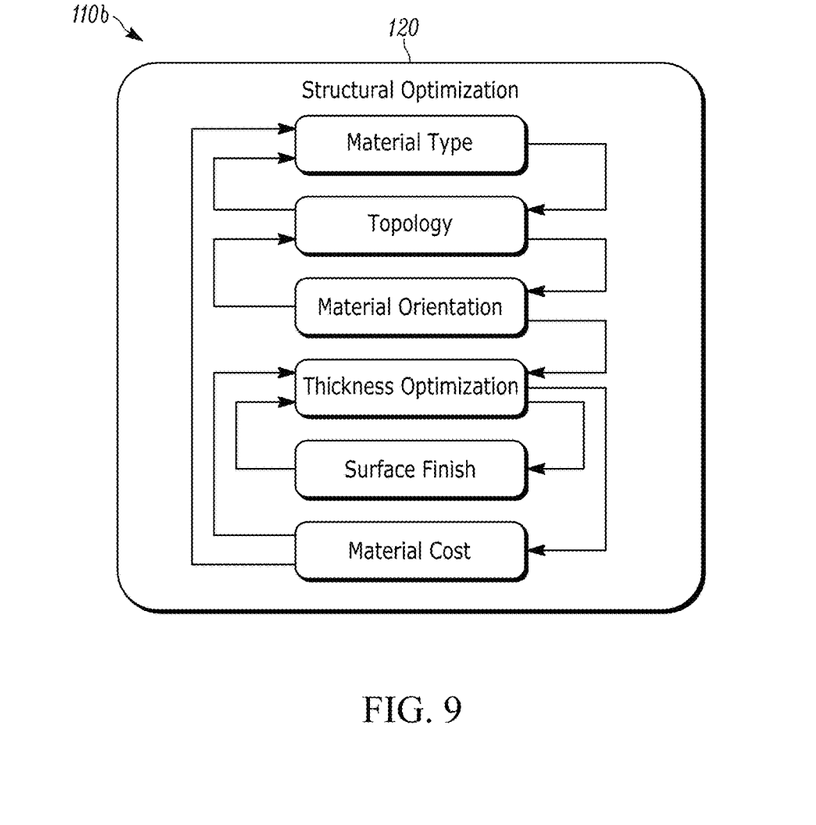

For example, while the flow charts 100, 100a, 100b in FIGS. 7-9 schematically illustrate the codependency between the material, structural, and manufacturing optimization steps, it will be appreciated that these steps can be carried out and executed by a computer 102. The computer 102 includes a material optimization component 110, a structural optimization 120, and a manufacturing optimization component 130 that cooperate in a non-transitory, computer readable medium to optimize the additive manufacturing of the multilayered part 50.

Referring to FIG. 7, the material optimization component 110 can constitute a formula, algorithm, look-up table or the like provided in the computer 102 and configured to optimize one or more parameters related to the material used in forming the multilayer component 50. The parameters can include, for example, the type of powder used, powder distribution, powder compaction, viscosity, and particle shape. The parameters can be input into the computer 102 by the user and sent to the material optimization component 110 for processing. The results of optimizing the material are sent to the structural optimization component 120.

The structural optimization component 120 can constitute a formula, algorithm, look-up table or the like provided in the computer 102 and configured to optimize one or more parameters related to the structure of the layers used in forming the multilayer component 50. The parameters can include, for example, the material type, topology, material orientation, thickness, surface finish, and material cost. The parameters can be input into the computer 102 by the user and sent to the structural optimization component 120 for processing. The results of optimizing the structure are sent to the manufacturing optimization component 130.

The manufacturing optimization component 130 can constitute a formula, algorithm, look-up table or the like provided in the computer 102 and configured to optimize one or more parameters related to forming the multilayer component 50. The parameters can include, for example, the material type, part orientation within the printer, the laser path, product cost, and production schedule. The parameters can be input into the computer 102 by the user and sent to the material optimization component 110 for processing.

As shown in FIG. 7, it is clear that the optimization components 110, 120, 130 are co-dependent and interrelated in that their results affect the results of the other components. To this end, many of the parameters within the components 110, 120, 130 are common between components, as indicated by the key 106. That said, the components 110, 120, 130 function simultaneously to cycle through various parameters until the optimization of each stage of the process is satisfied.

FIG. 8 illustrates a more specific implementation of the co-dependent relationship between the optimization components 110, 120, 130. In the material optimization component 110, round, titanium alloy powder are input as parameters. The powder has two sizes having a normal distribution. With these parameters in mind, the powder compaction process is optimized for a given fractional density. The value(s) of the optimized compaction process are sent to the structural optimization component 120.

In the structural optimization component 120, titanium alloy material is input as a parameter. The topology is then optimized for that material and loads to be applied to the material. The thickness is also optimized for a given topology, material, and applied load. Finally, the material cost is calculated based on the thickness and geometry of the layers forming the multilayered part 50. If the cost is below a set cost the result(s) are sent to the manufacturing optimization component 130. If the cost exceeds the set cost the topology and thickness are re-optimized until the cost falls below the set amount. The re-optimized results are then sent to the manufacturing optimization component 130.

In the manufacturing optimization component 130, titanium alloy material is input as a parameter. The laser path for forming the layers of the multilayer part 50 is then optimized for a minimum path length. The product cost is then calculated based on material, geometry, and total manufacturing time. If the cost is below the set cost the results(s) are sent to the material optimization component 110. If the cost exceeds the set cost the laser path is re-optimized until the cost falls below the set amount. The re-optimized results are then sent to the material optimization component 110.

Once the laser path is determined/optimized, the production schedule is calculated based on total manufacturing time. If the total time is above the set time, the results(s) are sent to the material optimization component 110. If the total time is below the set time the laser path is re-optimized until the total time exceeds the set time. The re-optimized results are then sent to the material optimization component 110.

It will be appreciated that the parameters within a single component can also be co-dependent and interrelated. In other words, the parameters within a component 110, 120, 130 can affect each other and the optimization process. FIG. 9 illustrates an example of how the parameters of the structural optimization component 120 are interrelated with one another. Consequently, selecting one type of parameter will affect the value or feasibility of other parameters, thereby affecting the optimization process as a whole.

The following example is for the purpose of illustration only and is not intended to limit the scope of the claims, which are appended hereto.

EXAMPLE

Material Optimization

In this example, the material was optimized using Ti64 round powder with normally distributed particle sizes to create three powder mixes: M1, M2, and M3.

Topology Optimization

Figure 10:
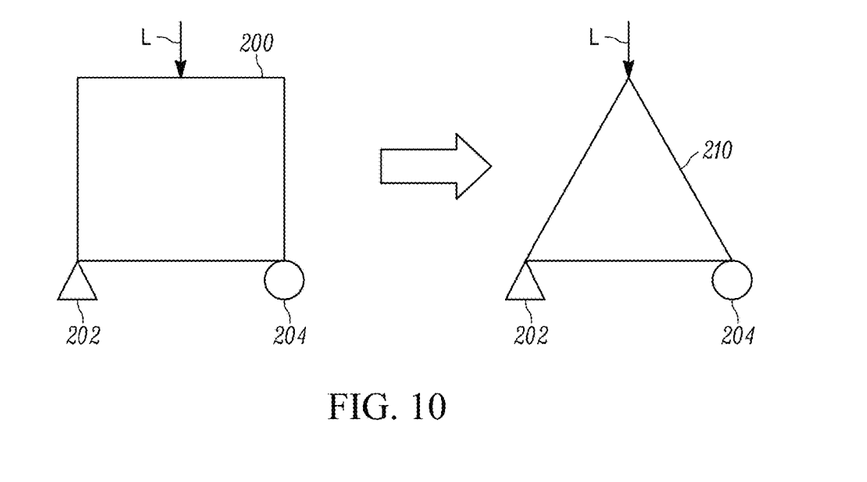
FIG. 10 depicts an example of a structural topology optimization for an additive manufactured part.

Referring to FIG. 10, a cubic structure 200 was formed and loaded with a load L at the top and supported by pin and roller supports 202, 204, respectively, at the bottom. The structure 200 was constrained to fit within the defined geometry and carry a predetermined load to the supports 202, 204. The topology was optimized given each powder mix M1, M2, M3 and the structure 200 then became a truss 210.

Structural (Thickness) Optimization

The thickness of each of the three truss members was optimized to minimize weight considering each mix M1, M2, M3. In this optimization, M2 provided the best solution, i.e., lowest weight, which was checked against the cost of the material. In this case, M2 was determined to be too expensive and the structure was re-optimized such that M1 provided the best solution.

Manufacturing Optimization

Given the mix M1 the shortest path of the laser was determined as well as its residency time and intensity. The production cost and schedule was computed and compared to the limiting values. In this case, the mix M1 did not meet the criteria and the optimization was then performed for the mix M3.

After one complete cycle, the mix M3 was re-optimized for topology and thickness as well as manufacturing parameters. If it met the performance, cost, and schedule restrictions, the design would be finalized. If it did not, new powder mixes M4, M5, etc. would need to be generated that may compromise on some parameters to meet the overall system requirements. The iterations continued until a powder mix, geometry, material thickness, and laser parameters were optimized to meet the cost, schedule, and performance criteria.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method for additive manufacturing a multilayered part comprising:
optimizing a powder material based on at least one parameter characterizing the powder material;
individually optimizing each layer of the multilayered part formed from the optimized powder material based on at least one parameter characterizing the layer; and
forming the multilayered part using additive manufacturing based on the optimized powder material and optimized layers constituting the multilayered part, the multilayered part being optimized based on at least one parameter characterizing the multilayered part.

2. The method of claim 1, wherein the parameters characterizing the powder material comprise at least one of material distribution, compaction, viscosity, and shape.

3. The method of claim 2, wherein prior to the forming, the method includes compacting the powder material according to a compaction parameter to provide the optimized powder material that is used to form the multilayered part.

4. The method of claim 3, wherein the compaction includes polarizing the powder material.

5. The method of claim 1, wherein the parameters characterizing each layer of the multilayered part comprise at least one of topology, material orientation, layer thickness, surface finish, and material cost.

6. The method of claim 1, wherein the parameters characterizing the multilayered part comprise at least one of part orientation, laser path, product cost, and production schedule.

7. The method of claim 1, wherein the method is stored in memory and implemented as instructions executed by one or more processing units.

8. The method of claim 1, wherein for each layer of the multilayered part the optimized powder material and the optimized layer are compared to the at least one parameter characterizing the multilayered part and each layer meeting the least one parameter being finalized, wherein in any layer falling outside the at least one parameter at least one of the optimized powder material and the optimized layer being modified until the at least one parameter is met and the layer finalized.

9. A non-transitory computer readable medium having instructions programmed to perform a method comprising:
optimizing a powder material based on at least one parameter characterizing the powder material;
individually optimizing each layer of the multilayered part formed from the optimized powder material based on at least one parameter characterizing each respective layer; and
controlling an additive manufacturing device to form the multilayered part using additive manufacturing based on the optimized powder material and each of the optimized layers constituting the multilayered part, the multilayered part being optimized based on at least one parameter characterizing the multilayered part.

10. The computer readable medium of claim 9, wherein the parameters characterizing the powder material comprise at least one of material distribution, compaction, viscosity, and shape.

11. The computer readable medium of claim 10, wherein the controlling further comprising controlling compacting the powder material according to a compaction parameter to provide the optimized powder material that is used to form the multilayered part.

12. The computer readable medium of claim 11, wherein the controlling includes controlling polarizing the powder material according to the compaction parameter prior to forming at least some of the layers of the multilayered part.

13. The computer readable medium of claim 9, wherein the parameters characterizing each layer of the multilayered part comprise at least one of topology, material orientation, layer thickness, surface finish, and material cost.

14. The computer readable medium of claim 9, wherein the parameters characterizing the multilayered part comprise at least one of part orientation, laser path, product cost, and production schedule.

15. The computer readable medium of claim 9, wherein the method is stored in memory and implemented as instructions executed by one or more processing units.

16. The computer readable medium of claim 9, wherein for each layer of the multilayered part the optimized powder material and the optimized layer are compared to the at least one parameter characterizing the multilayered part and each layer meeting the least one parameter being finalized, wherein in any layer falling outside the at least one parameter at least one of the optimized powder material and the optimized layer being modified until the at least one parameter is met and the layer finalized.

17. A system comprising:
a material optimizing component, executed by a computing device, for optimizing a powder material based on at least one parameter characterizing the powder material;
a structural optimization component, executed by a computing device, for individually optimizing each layer of the multilayered part formed from the optimized powder material based on at least one parameter characterizing the layer; and
an additive manufacturing device to form the multilayered part using an additive manufacturing process that is controlled for each layer of the multilayered part based on the optimized powder material and optimized layers constituting the multilayered part, the multilayered part being optimized based on at least one parameter characterizing the multilayered part.

18. The system of claim 17, wherein the parameters characterizing the powder material comprise at least one of material distribution, compaction, viscosity, and shape.

19. The system of claim 18, wherein the additive manufacturing device is configured, in response to control instructions provided by the computing device, to compact the powder material according to the compaction parameter prior to forming at least some of the layers of the multilayered part.

20. The system of claim 19, wherein the additive manufacturing device is configured to control polarization of the powder material according to the compaction parameter prior to forming at least some of the layers of the multilayered part.

21. The system of claim 17, wherein the parameters characterizing each layer of the multilayered part comprise at least one of topology, material orientation, layer thickness, surface finish, and material cost.

22. The system of claim 17, wherein the parameters characterizing the multilayered part comprise at least one of part orientation, laser path, product cost, and production schedule.

23. The system of claim 17, wherein for each layer of the multilayered part the optimized powder material and the optimized layer are compared to the at least one parameter characterizing the multilayered part and each layer meeting the least one parameter being finalized, wherein in any layer falling outside the at least one parameter at least one of the optimized powder material and the optimized layer being modified until the at least one parameter is met and the layer finalized.

\* \* \* \* \*